United States Patent

Reeves

[15] 3,698,259
[45] Oct. 17, 1972

[54] RELATING TO ENERGY ABSORBING SHAFTS AND METHOD OF MAKING SAME

[72] Inventor: Keith Clarkson Reeves, Frankston, Australia

[73] Assignee: General Motors Corporation, Detroit, Mich.

[22] Filed: Feb. 17, 1971

[21] Appl. No.: 116,145

[30] Foreign Application Priority Data

Feb. 23, 1970  Australia..............PA 0411/70

[52] U.S. Cl.....................74/492, 29/155 C, 188/129, 287/126
[51] Int. Cl. ..............................................B62d 1/18
[58] Field of Search .74/492, 493; 188/129; 287/126; 29/155 C

[56] References Cited

UNITED STATES PATENTS 3,434,369   3/1969   Runkle........................74/493

Primary Examiner—Milton Kaufman
Attorney—W. E. Finken and D. L. Ellis

[57] ABSTRACT

An energy absorbing shaft for steering motor vehicles and other purposes comprising a pair of telescopically engaged inner and outer members one of which has a plurality of circumferentially spaced and parallel edges extending lengthwise thereof and the other member has a plurality of circumferentially spaced and parallel grooves formed in zones extending lengthwise of the shaft, each of the grooves having a cross sectional formation which is substantially complementary to said edges and avoids frictional engagement between said inner and outer members between said zones, said edges and grooves having a predetermined interference fit so that the shaft assembly is capable of torque transmission in either direction and is also adapted automatically to collapse under predetermined axial impact at a predetermined rate.

4 Claims, 1 Drawing Figure

PATENTED OCT 17 1972     3,698,259
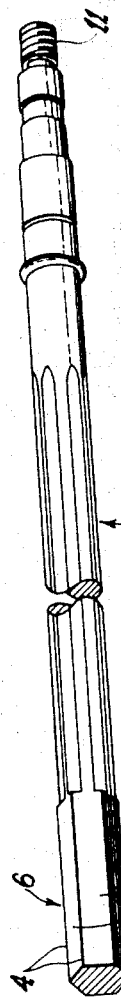
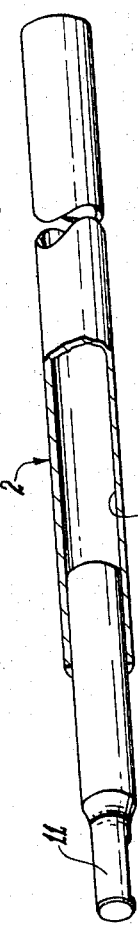
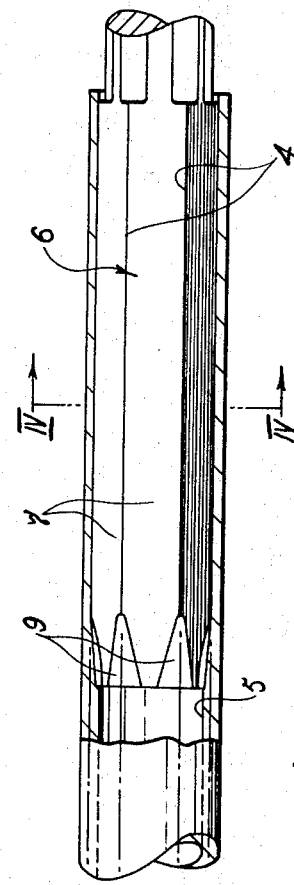
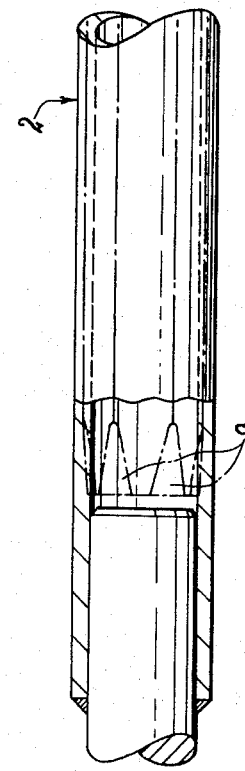
INVENTOR
Keith Clarkson Reeves
BY
D. L. Ellis
ATTORNEY

RELATING TO ENERGY ABSORBING SHAFTS AND METHOD OF MAKING SAME

This invention relates to energy absorbing shafts and particularly steering shafts for motor vehicles and to a method of manufacturing such shafts. The invention is especially concerned with a motor vehicle steering shaft which will collapse at a predetermined rate upon the application of an axial load which exceeds a predetermined value. By "rate" is meant "rate of energy absorption," that is, work performed against a resisting force per unit of collapse movement.

So-called energy absorbing steering column assemblies are well known and usually include a telescopically collapsible steering shaft which may be maintained in an extended operative position, by, for example, shear pins of injection moulded thermoplastics. A separate energy absorbing member which is connected to the steering column and to the vehicle structure, and is designed to collapse at a predetermined rate upon impact, as in a vehicle collision, is also provided. In this manner the telescopic collapse of the steering shaft is retarded to a desired rate.

It is a disadvantage of such assemblies that the energy absorbing member is destroyed during operation. Furthermore, the member does not collapse at a constant rate. In addition, the shear pins of the steering shaft are liable to be damaged in transit or during installation.

The primary object of the present invention is to provide an improved steering shaft of the kind indicated which is inherently energy absorbing, that is, it will collapse under impact at a predetermined substantially constant rate without the assistance of a separate energy absorbing member as aforesaid. In addition, the steering shaft is repairable after collapse and is not so liable to damage by mishandling.

Another object is to provide a particularly simple and inexpensive method of manufacturing the improved shaft. This improved method of manufacture ensures optimum conditions of assembly without need for expensive tooling.

According to the invention the improved energy absorbing shaft comprises an outer member and an inner member partially located within the outer member in axial alignment therewith, one of the shaft members having a plurality of circumferentially spaced ribs or edges extending lengthwise thereof in substantially parallel relationship and substantially parallel with the shaft axis, said ribs or edges having a predetermined interference fit within a plurality of circumferentially spaced and substantially parallel grooves formed in zones in the other shaft member and which extend lengthwise thereof and substantially parallel with the shaft axis, each of said grooves having a cross sectional formation which is substantially complementary to that of said ribs or edges and said other shaft member being of such cross sectional formation that it does not engage the associated shaft member between said zones whereby said shaft assembly is capable of torque transmission in either direction and is also adapted automatically to collapse under predetermined axial impact at a predetermined rate.

According to another features of the invention an improved method of manufacturing the aforesaid shaft is provided which includes the steps of forming inner and outer shaft members capable of being telescopically interengaged in axial alignment, forming a plurality of ribs or edges on one of said shaft members and which are circumferentially spaced and extend lengthwise of their respective shaft member in substantially parallel relationship, and forming the associated shaft member of tubular formation in cross section, telescopically interengaging said inner and outer shaft members and forcing the inner shaft member axially inwardly within the outer shaft member until the inner shaft member reaches that operative position which it is intended to occupy when the shaft assembly is fully collapsed whereby during said relative movement the outer shaft member is deformed in such a manner as to form a groove in each of a plurality of circumferentially spaced and substantially parallel zones which extend lengthwise of the assembled shaft and substantially parallel with the axis thereof, the inner shaft member being subsequently withdrawn lengthwise in relation to the outer shaft member until the shaft assembly is of the desired overall operative length whereby an interference fit providing predetermined frictional engagement is effected between said shaft members which yieldingly opposes collapse of the shaft assembly and at the same time provides effective torque transmission between said inner and outer shaft members.

Various novel features of the invention will be readily apparent, from the following detailed description of a practical embodiment which is particularly adapted to form the steering shaft of a motor vehicle.

Referring to the drawings;

FIG. 1 is a part sectional and contracted view of an elongated inner member which forms part of the improved composite shaft;

FIG. 2 is a part sectional and contracted view of an elongated outer member which also forms part of the improved shaft;

FIG. 3 is a part sectional and contracted side elevation on an enlarged scale, showing the inner and outer shaft members partly assembled in accordance with the improved method of making the composite shaft; and FIG. 4 is a cross-section of an enlarged scale taken on the line IV—IV of FIG. 3.

In accordance with the invention, the improved motor vehicle steering shaft includes two main components, namely an elongated outer member 2 and an inner member 3 which is located within the outer member in axial alignment therewith. Means are provided for effecting predetermined frictional engagement between these parts in such a manner as normally to oppose relative longitudinal movement therebetween and at the same time provide for effective torque transmission in both directions.

However, such means are also adapted to yield and permit controlled telescopic movement between these telescoped components so as to reduce the effective length of the shaft in the event of predetermined axial loading on the shaft being exceeded, such as may occur during an accident when the driver of a motor vehicle may take forcible contact with the steering wheel or when the end of the steering shaft remote from the steering wheel is forced rearwardly for example as the result of a collision.

For this purpose, one of the interengaged shaft members is provided with a plurality of circumferentially spaced ribs or edges 4 extending lengthwise of the shaft. The adjacent surface 5 of the associated shaft member is preferably of circular or part circular formation, so as to co-operate with the ribs or edges in reducing the frictional engagement between the shaft components.

These ribs or edges are preferably parallel with each other and with the shaft axis. Furthermore, the ribs or edges do not extend throughout the full length of the shaft component on which they are formed, but are located on part only of this shaft member, the rest of the shaft being formed in such a manner as to provide adequate clearance.

In accordance with a preferred embodiment, the edges 4 are formed on the outer end portion 6 only of the inner member 3 of the shaft. In this case, the relative portion of the shaft inner member is of cyclic polygonal formation in cross section so as to provide flat surfaces 7 between the longitudinal ribs or edges. Or that portion of the shaft between adjacent ribs or edges may be of concave cross section or be otherwise relieved in any suitable manner.

In this case, the inner surface of the outer shaft member 2 is of substantially circular form in cross section as at 5 with a plurality of circumferentially spaced and substantially parallel grooves 8 so as to provide the desired area of frictional engagement with the ribs or edges of the inner shaft member. The cross sectional formation of the latter is preferably substantially complementary to that of the associated ribs.

For example, if the cross sectional formation of the inner shaft member 3 is in the form of a hexagon, the circumscribed circle of the hexagon is preferably larger in diameter and the inscribed circle of the hexagon smaller in diameter than the internal diameter of the outer shaft member 2.

By this arrangement an interference fit between such inner and outer shaft members is obtained when the parts are interengaged as seen in FIG. 4. In practice it has been found that a diametral interference fit of from 0.020 to 0.050 inch is suitable.

The outer shaft member 2 is preferably formed of tubing composed of steel or some other metal having an elastic limit suitable for the purpose. Steel shafting of hexagonal cross section has been found to be suitable for the inner shaft member 3 which is preferably relatively harder than the outer shaft member.

The outer end of the inner shaft member which is adapted to engage the outer shaft member is preferably tapered lengthwise as at 9 so as to facilitate the desired telescopic engagement between these parts.

According to the improved method of manufacture, and assuming that the aforesaid plurality of ribs or edges are formed on the inner shaft member 3 and that the outer shaft member 2 is of tubular formation, deformation of the outer shaft member to form the grooves 8 is obtained by forcing the inner shaft member axially inwardly within the outer shaft member until the inner shaft member reaches the position which it is required to assume when the telescopic steering shaft is fully collapsed as shown in broken lines in FIG. 3. The inner shaft member 3 is then withdrawn lengthwise in relation to the outer shaft member until the composite shaft assembly is of the desired overall length.

It is understood that during the operation of forcibly inserting the inner shaft member into the tubular outer member, the metal in the aforesaid zones in which the grooves are formed, is stressed beyond the elastic limit of the metal. It is further understood that as the frictional engagement between the inner and outer shaft members occurs at a plurality of circumferentially spaced zones only, residual stress remains in the outer shaft member and produces a radially compressive load therein which yieldingly opposes lengthwise movement between the associated shaft members. Furthermore the shaft assembly so formed has desirable torque transmitting characteristics with an absence of back lash.

Furthermore, the axial load required for subsequent relative axial movement between the inner and outer shaft members so as to reduce their effective length, will be less than that required during the initial manufacturing operation. The magnitude of this overloading is predetermined by the aforesaid residual stress in the outer shaft member and may be effectively determined by appropriate choice of metals, dimensions, surface finish between the inner and outer shaft members and lubrication media. In addition, due to the fact that the aforesaid ribs or edges are formed on part only of the shaft, the effective length of the inner shaft member in frictional engagement with the outer shaft member is adapted to remain constant with the result that the rate of collapse for any given axial loading will also be substantially constant.

Although it is preferred to form the aforesaid ribs on the exterior of the inner shaft member 3, it will be apparent that the invention is not limited thereto, but that such ribs may be formed in any suitable manner on the internal surface of the outer shaft member 4. In that case, the inner shaft member may be of circular form in cross section.

By the invention, an improved steering shaft is provided which is inherently energy absorbing in that it is designed to collapse at a predetermined substantially constant rate without the provision of an additional energy absorbing member. It will also be appreciated that after collapse the inner shaft member may be withdrawn to its original operative position, thus readily restoring the shaft to the desired effective length. Should any partial collapse occur between the inner and outer shaft members as a result of mishandling whilst in transit, or during installation this may be readily corrected by effecting appropriate relative movement between the inner and outer shaft members.

The improved shaft is provided at its opposite ends with any suitable type of connecting means 11 which are preferably of a readily detachable nature. Furthermore, the shaft is also preferably supported, when in use, at an intermediate point in its length by a bracket or the like which may be connected to the dashboard or any other firm anchorage on the vehicle.

The improved method of manufacture eliminates the use of special tools to deform the outer shaft member. Furthermore, it results in an extremely high degree of accuracy of fit between these shaft components such as otherwise would be possible only by most expensive methods of high precision manufacturing or by costly methods of selective assembly. The method also enables the employment of metals having a relatively broad dimensional tolerance range.

Although it has been convenient by way of example to describe the invention as applied to an energy absorbing shaft for steering motor vehicles, it is to be clearly understood that the invention is not limited thereto, but on the contrary may be readily employed for a wide variety of other purposes in which a controlled collapse of one or more energy absorbing shafts is required.

For example, the improved shafts may be readily employed for supporting bumper bars at the front and rear of motor vehicles. In this case such bumper bars would prove to be most useful in absorbing shocks that may be encountered when the vehicle is travelling at a relatively slow speed such as about 5 m.p.h. more or less. Obviously, such bumper bars could be readily restored to their original operative positions after being involved in a collision.

It is to be understood that various other alterations, modifications and/or additions may be introduced into the foregoing without departing from the ambit of the invention as defined by the appended claims.

Having now described my invention, what I claim as new and desire to secure by letters patent is:

1. A method of making an energy absorbing shaft for steering motor vehicles and other purposes which comprises forming inner and outer shaft members capable of being telescopically interengaged in axial alignment, forming a plurality of edges on one of said shaft members and which are circumferentially spaced and extend lengthwise of their respective shaft member in substantially parallel relationship, and forming the associated shaft member of tubular formation in cross section, telescopically interengaging said inner and outer shaft members and forcing the inner shaft member axially inwardly within the outer shaft member until the inner shaft member reaches that operative position which it is intended to occupy when the shaft assembly is fully collapsed whereby during said relative movement the outer shaft member is deformed in such a manner as to form a groove in each of a plurality of circumferentially spaced and substantially parallel zones which extend lengthwise of the assembled shaft and substantially parallel with the axis thereof, the inner shaft member being subsequently withdrawn lengthwise in relation to the outer shaft member until the shaft assembly is of the desired overall operative length whereby an interference fit providing predetermined frictional engagement is effected between said shaft members which yieldingly opposes collapse of the shaft assembly and at the same time provides effective torque transmission between said inner and outer shaft members.

2. A method according to claim 1, wherein during the formation of said parallel zones, the latter are stressed beyond their elastic limit but sufficient residual stress remains in the rest of the outer shaft member to provide a predetermined radial compressive stress on the inner shaft member so that when in use and the shaft assembly is subjected to predetermined axial loading it is adapted automatically to collapse at a predetermined substantially constant rate.

3. A composite shaft assembly adapted for torque transmission and for axial telescopic collapse in an energy absorbing mode from a normal length to a fully collapsed length comprising, in combination, a first shaft member having an internal surface portion, a second shaft member having an external surface portion, one of said first and said second surface portions having a finite length less than the length of the other, means on one of said first and said second shaft members defining a plurality of angularly spaced spline-like edges extending parallel to the longitudinal axis of said one shaft member over generally the entire length of the one of said internal and said external surface portions means on the other of said first and said second shaft members defining a corresponding plurality of angularly spaced grooves complementary to said spline-like edges and extending parallel to the longitudinal axis of said other shaft member over generally the entire length of the one of said internal and said external surface portions thereon, said second shaft member being telescopically disposed in said first shaft member with each of said spline-like edges disposed in a corresponding one of said grooves under predetermined interference engagement and with the shorter of said spline-like edges and said grooves in full contact with the other, said interference engagement generating substantial mechanical friction between said spline-like edges and said grooves for resisting relative telescopic movement between said first and said second shaft members and for effecting energy absorption at a constant rate during such telescopic movement and said spline-like edges and said grooves cooperating in uniting said first and said second shaft members for unitary rotation, and means on one of said first and second shaft members defining a plurality of reliefs between the ones of said spline-like edges and said grooves thereon operative to restrict engagement between said first and said second shaft members to said spline-like edges and said grooves.

4. A composite shaft assembly adapted for torque transmission and for axial telescopic collapse in an energy absorbing mode from a normal length to a fully collapsed length comprising, in combination, a first shaft member having a cylindrical internal surface portion, a second shaft member having an external surface portion of predetermined length substantially less than the length of said internal surface portion, said external surface portion defining a regular polygon in cross section and including a plurality of flat surfaces intersecting to form a corresponding plurality of angularly spaced spline-like edges extending parallel to the longitudinal axis of said second shaft member the entire length of said external surface portion, and means on said first shaft member defining a corresponding plurality of angularly spaced grooves in said internal surface portion complementary to said spline-like edges and extending in length a distance substantially exceeding the length of said spline-like edges, said second shaft member being telescopically disposed in said first shaft member with each of said spline-like edges disposed in a corresponding one of said grooves under predetermined interference engagement and with said spline-like edges in full contact with said grooves, said interference engagement generating substantial mechanical friction between said spline-like edges and said grooves for resisting relative telescopic movement between said first and said second shaft members and for effecting energy absorption at a constant rate during such telescopic movement and said spline-like edges and said grooves cooperating in uniting said first and said second shaft members for unitary rotation, said grooves being operative to divide said internal surface portion into a plurality of arcuate sectors defining reliefs between said grooves for restricting engagement between said first and said second shaft members to said spline-like edges and said grooves.

* * * * *